(12) United States Patent
Liu

(10) Patent No.: US 7,696,664 B2
(45) Date of Patent: Apr. 13, 2010

(54) MAGNETIC PATH CLOSED ELECTRIC GENERATOR

(76) Inventor: Gang Liu, General Office of Municipal Government, 233 Zhongyuan West Road, Zhengzhou City, Henan (CN)

( * ) Notice: Subject to any disclaimer, the term of this patent is extended or adjusted under 35 U.S.C. 154(b) by 0 days.

(21) Appl. No.: 12/424,236

(22) Filed: Apr. 15, 2009

(65) Prior Publication Data

US 2009/0200892 A1    Aug. 13, 2009

Related U.S. Application Data

(63) Continuation of application No. PCT/CN2007/070854, filed on Oct. 9, 2007.

(30) Foreign Application Priority Data

| Oct. 18, 2006 | (CN) | ............ 2006 1 0107321 |
| Nov. 8, 2006 | (CN) | ............ 2006 1 0107386 |
| Jul. 31, 2007 | (CN) | ............ 2007 1 0054870 |

(51) Int. Cl.
    H02K 1/00    (2006.01)
(52) U.S. Cl. ............................................. 310/216.106
(58) Field of Classification Search ............ 310/216.01, 310/216.106, 216.076, 216.108, 215
    See application file for complete search history.

(56) References Cited

U.S. PATENT DOCUMENTS

2001/0054855 A1* 12/2001 Echtler et al. ............... 310/216

2005/0146238 A1* 7/2005 Morikaku et al. ............ 310/215

FOREIGN PATENT DOCUMENTS

| CN | 1036484 | 10/1989 |
| CN | 2126942 | 2/1996 |
| CN | 1213885 | 4/1999 |
| CN | 1405955 | 3/2003 |
| JP | 2004-147372 | 5/2004 |
| JP | 2005-185041 | 7/2005 |

* cited by examiner

*Primary Examiner*—Nguyen N Hanh
(74) *Attorney, Agent, or Firm*—J.C. Patents

(57) ABSTRACT

A magnetic path closed electric generator includes a base (9), a housing (8), a stator (3), a rotator (5), a rotation shaft (7) and a transmission wheel. A magnetic permeability neck (12) is fixed on the stator; a coil winding (2) on the stator is fixed on the magnetic permeability bracket (1) and hitches outside a magnetic permeability neck; a low magnetic permeability medium (13) is disposed between the magnetic permeability bracket and the magnetic permeability neck. When the rotator rotates, a magnetic body (4) rotates along with it. The magnetic permeability neck is inducted to permeate magnetic and generate electric current with change of flux passing through the coil winding. A magnetic field generated by the electric current in the coil winding passes through the magnetic permeability bracket. The coil winding on the stator and the magnetic body on the rotator form a magnetic line closed loop in their own magnetic field. There is only small magnetic attracting force between the rotator and the stator.

10 Claims, 8 Drawing Sheets

MAGNETIC PATH CLOSED ELECTRIC GENERATOR

CROSS-REFERENCE TO RELATED APPLICATIONS

This application is a continuation of International Application No. PCT/CN2007/070854, filed on Oct. 9, 2007, which claims the priority benefits of Chinese Patent Application No. 200610107321.7, filed on Oct. 18, 2006, Chinese Patent Application No. 200610107386.1, filed on Nov. 8, 2006, and Chinese Patent Application No. 200710054870.7, filed on Jul. 31, 2007. The contents of the above identified applications are incorporated herein by reference in their entirety.

FIELD OF THE TECHNOLOGY

The present invention relates to an electric generator, particularly to a magnetic path closed electric generator in a novel structure with closed magnetic paths which are respectively formed by magnetic lines generated by a magnetic body on a rotator and a coil on a stator.

BACKGROUND

Currently, most of well-known electric generators generate electric current by prime mover driving the rotator to rotate so as to cause magnetic induction at a coil. However, magnetic field induced by coil tends to impede rotation of the rotator. The electric power obtained by this method is quite undesirable. Therefore, it is quite urgent for people to solve the problem of raising power converting efficiency of an electric generator. A patent application (Publication No. is CN1405955) provides a "High-Quality Low-Consumption Electric Generator" which does not solve the problem of low work-energy converting efficiency of an electric generator although it has solves a problem of voltage adjusting in a permanent magnetic electric generator. A patent application (Publication No. is CN1036484) provides "A Novel Brushless Electric Generator" which raises output electric current of an electric generator, but there still exists very strong magnetic repelling-attracting force when a stator and a rotator of an electric generator are working, it is still needed to apply a large amount of work for the prime mover to drive the rotator to rotate so as to overcome the magnetic repelling-attracting force of field, and it also does not solve the problem of low work-energy converting efficiency of an electric generator.

SUMMARY

A subject of the present invention is to provide a magnetic path closed electric generator to effectively solve the technical problem of low work-energy converting efficiency of an existing electric generator.

In order to realize the above subject, the present invention provides a magnetic path closed electric generator, a base, a housing, a stator, a rotator, a rotation shaft and a transmission wheel, wherein the rotator is made up of a magnetic body, a magnetic permeability material and a fixing part, and is fixed to the rotation shaft; the rotation shaft and the housing are in slip connection; one end of the rotation shaft is fixed to the transmission wheel for inputting power; the stator is fixed to the housing; the housing is made up of magnetic permeability material and serves as mechanical support of a rotating part; a coil winding is disposed on the stator and is fixed to a magnetic permeability bracket; one frame hollow portion of the magnetic permeability bracket hitches outside a magnetic permeability neck on the stator; a low magnetic permeability medium is disposed between the magnetic permeability bracket and the magnetic permeability neck on the stator to keep them in a certain distance; the transmission wheel drives the rotator to rotate by the rotation shaft; a magnetic permeability boot and the magnetic permeability neck on the stator are inducted by the magnetic body on the rotator to permeate magnetic; with a magnetic flux change of magnetic lines within the coil winding, the winding coil is inducted to generate electric current; the low magnetic permeability medium is disposed between the magnetic permeability bracket and the magnetic permeability neck to separate them in a certain distance; the magnetic lines tend to pass through the magnetic permeability material which is easiest to pass; the magnetic lines and a magnetic field generated by the electric current in the coil winding concentrate at the magnetic permeability bracket and pass through it; the magnetic permeability boot fixed to the stator does not have the magnetic field generated by the coil winding to impede rotation of the rotator; and there is only small magnetic attracting force between the rotator and the stator.

The magnetic permeability bracket fixing the coil winding is made up of at least one kind of the magnetic permeability material.

The magnetic permeability bracket inside the coil winding and outside the coil winding is constituted by fixing and connecting magnetic permeability material.

The housing as well as the magnetic permeability boot and the magnetic permeability neck on the stator are made up of at least one kind of the magnetic permeability material.

Corresponding overlapping parts between the magnetic permeability bracket and the magnetic permeability neck, the magnetic permeability bracket and the magnetic permeability boot, and the magnetic permeability bracket and the housing are provided with at least one kind of the low magnetic permeability medium to separate them in a certain distance.

A part of a core portion of a frame of the magnetic permeability bracket corresponding to the magnetic permeability neck is a hollow structure and hitches outside the magnetic permeability neck.

The magnetic permeability boot is disposed at one end of the magnetic permeability neck, the magnetic permeability boot is corresponding to one magnetic surface of the magnetic body on the rotator, and the other end of the magnetic permeability neck is fixed to the housing.

Magnetic lines in a magnetic field generated by electric current in the coil winding concentrate at the magnetic permeability bracket and pass through it to form a magnetic line closed loop.

The magnetic body fixed to the rotator is made up of at least one permanent magnetic body or at least one electric magnetic body, or made up of an integrated combination of at least one permanent magnetic body and at least one electric magnetic body.

There is at least one coil winding for magnetic permeability corresponding to every magnetic pole induction of the magnetic body on the rotator, and the coil winding is combined by at least two winding in parallel or in series.

The magnetic path closed electric generator in accordance with the present invention utilizes a characteristic that magnetic lines tends to pass through the magnetic permeability material which is easiest to pass, makes the magnetic permeability bracket of the stator coils hitch outside the magnetic permeability neck of the stator, and disposes the medium between the coil bracket and the magnetic permeability neck of the stator to keep the magnetic permeability bracket and the magnetic permeability neck in a certain distance. The stator and the rotator respectively form the magnetic line closed loop in magnetic field. There is quite small magnetic attraction force between the rotator and the stator. The prime motor uses quite small power to drive the rotator to rotate so as to enable the electric generator to generate electric current for being outputted and applying work. The present invention has reasonable design, no pollution, and high work-energy converting efficiency, which can be widely used in power generating devices such as power plants, automobiles, ships etc.

The present invention will be described in more detail with reference to the drawings and embodiments.

1- magnetic permeability bracket;
2- coil winding;
3- stator;
4- magnetic body;
5- rotator;
6- magnetic permeability boot;
7- rotation shaft;
8- housing;
9- base;
10- transmission wheel;
11- magnetic permeability material;
12- magnetic permeability neck;
13- low magnetic permeability medium.

DETAILED DESCRIPTION

Figure 1:
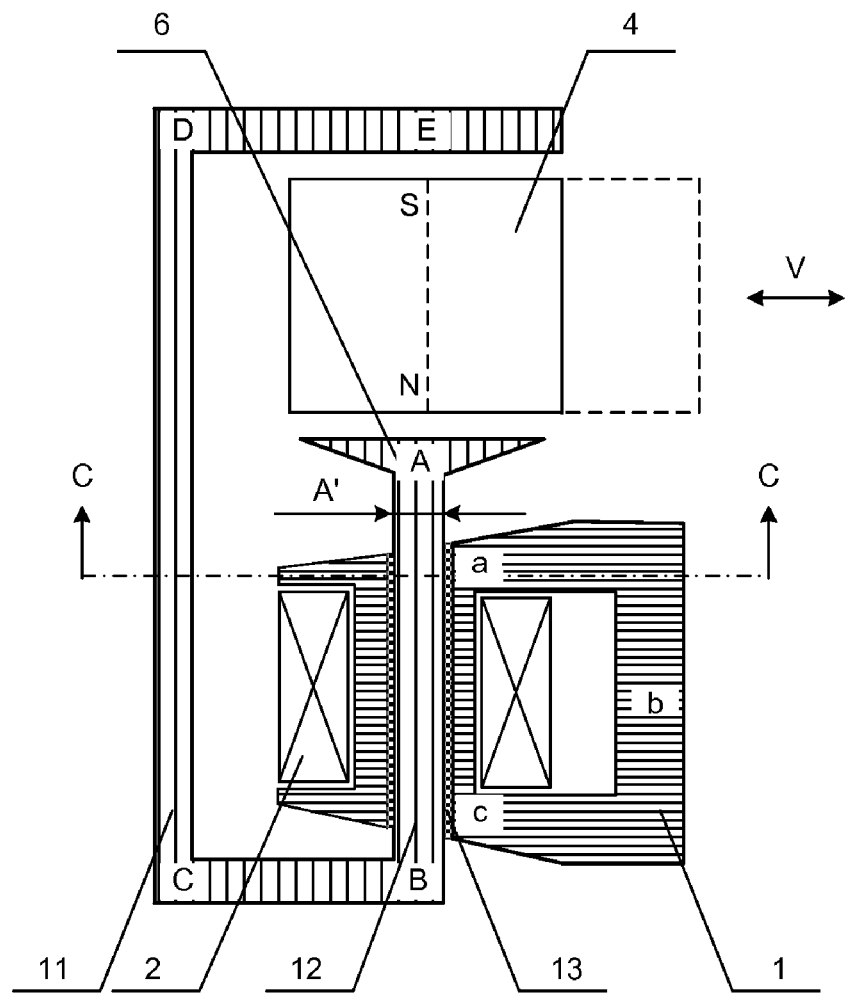
FIG. 1 is a structural schematic view of the present invention.
Figure 2:
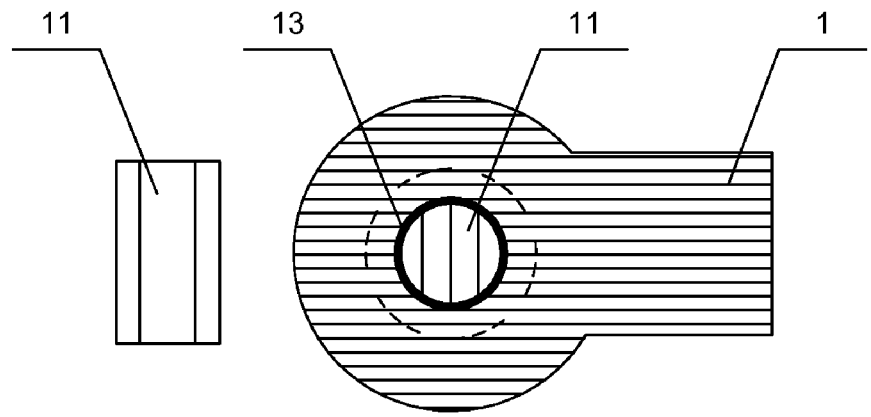
FIG. 2 is a cross-section schematic view along direction C-C in FIG. 1.

FIG. 1 is a structural schematic view of the present invention; FIG. 2 is a cross-section schematic view along direction C-C in FIG. 1. As commonly known, magnetic lines tend to pass through magnetic permeability material which is most easily to be passed. By making use of this characteristic of the magnetic lines, the present invention fixes a coil winding 2 to a magnetic permeability bracket 1. There is magnetic permeability material fixed and communicated at both interior and exterior of the coil winding 2. This magnetic permeability material constructs the magnetic permeability bracket 1 of the coil winding. One frame hollow portion of the magnetic permeability bracket 1 hitches on the magnetic permeability neck 12 made up of the magnetic permeability material corresponding to it. The magnetic permeability bracket 1 and the magnetic permeability neck 12 are separated in a certain distance by a low magnetic permeability medium 13 located at a corresponding part between the magnetic permeability bracket 1 and the magnetic permeability neck 12. A magnetic permeability boot 6 is disposed at one end of the magnetic permeability neck 12. The magnetic permeability boot 6 is corresponding to an N pole of the magnetic body 4. The other end of the magnetic permeability neck 12 is fixed to the magnetic permeability material 11. A position E in the magnetic permeability material 11 is corresponding to an S pole of the magnetic body 4. As shown in HG. 1, the magnetic body 4 moves left and right incessantly. Magnetic lines of the magnetic body 4 start from the N pole, pass through the magnetic permeability boot 6, reaches the position E in the magnetic permeability material 11 along the magnetic permeability material 11, and comes back to the S pole of the magnetic body 4 to enter into the magnetic body 4 so as to form a magnetic line permeability closed loop of the magnetic body 4. The magnetic body 4 incessantly moves so that magnetic lines incessantly cause magnetic permeability change within the coil winding 2 which is inducted to generate electric current. As the low magnetic permeability medium 13 is disposed at a corresponding part between the magnetic permeability bracket 1 and the magnetic permeability neck 12 to separate them in a certain distance and the magnetic lines tend to pass through the magnetic permeability material which is easiest to pass, the magnetic lines of magnetic field generated by electric current in the coil winding 2 concentrate within the magnetic permeability bracket 1, passes through positions a, b and c from the magnetic permeability bracket 1 to form a magnetic line closed loop. The magnetic lines of the magnetic body 4 passes through the magnetic permeability material 11 and comes back into the magnetic body 4 from a position A, B, C, D and E to form a magnetic line closed loop of the magnetic body 4. Therefore, during moving, the magnetic body 4 is not affected by a magnetic repelling-attracting force generated by electric current in the coil winding 2. The movement of the body 4 only needs to overcome magnetic attracting force of the material of the magnetic permeability boot 6 with the magnetic body 4 of itself and friction force generated during movement.

In order to ensure the magnetic lines in the magnetic permeability material 11, the magnetic permeability boot 6 and the magnetic permeability bracket 1 can normally pass through, that is, two magnetic line closed loops can normally permeate magnetic; it can be solved by adjusting magnetic flux and magnetic line density. Firstly, it is ensured that the magnetic permeability boot 6 should have enough shape and area for magnetic permeability, a part AB of the magnetic permeability material 11 should have enough shape volume, and the magnetic lines of the magnetic body 4 should completely saturate the magnetic permeability material at the part AB when reaching maximum flux at the part AB. It can be seen according to Lenz Principle that the magnetic field induced in the coil winding 2 always strives to keep the flux of the original magnetic field in the coil winding 2 so as to generate a magnetic field in the coil winding 2 opposite to the magnetic field with the same flux. The amount of the magnetic field should be proportional with respect to the magnetic flux passing through the magnetic field. And this magnetic field will generate magnetic repelling-attracting force on the magnetic body 4 by the magnetic permeability boot 6 to impede movement of the magnetic body 4, which is just the problem to be solved in the present invention. By utilizing the characteristic that magnetic lines tends to pass through the magnetic permeability material which is easiest to pass, We design, make experiments and manufacture the magnetic permeability bracket 1 and the magnetic permeability material 11 in the above figures so as to make the ability of magnetic permeability flux of the material of the magnetic permeability bracket 1 greater than the maximum magnetic flux of the magnetic permeability material 11. During the magnetic body 4 permeating magnetic to the magnetic permeability boot 6, the magnetic line density in the magnetic permeability material 11 is always greater than the magnetic line density in the magnetic permeability bracket 1 so that the magnetic lines of magnetic field induced by the coil winding 2 passes through the magnetic permeability bracket 1 easily to pass where the magnetic line density is relatively low, that is, the magnetic lines of magnetic field induced by the coil winding 2 passes through positions a, b and c in the magnetic permeability bracket 1. As the magnetic permeability bracket 1 and the magnetic permeability neck 12 are separated by the low magnetic permeability medium, the magnetic lines in the magnetic permeability bracket 1 will not permeate magnetic with the magnetic permeability neck 12 so that the magnetic permeability boot 6 will not generate magnetic repelling-attracting force which would influence in the movement of the magnetic body 4.

The magnetic flux in the above magnetic permeability material is namely a magnetic line density per unit area. In practical implementation, it is only needed to ensure material shape and volume of part A' in the magnetic permeability neck 12 of the magnetic permeability material 11 as shown in FIG. 1 and ensure to saturate the part A' when the magnetic flux reaches maximum during the magnetic body 4 permeating magnetic to the magnetic permeability boot 6, so as to make the magnetic line density of magnetic permeability at part A' greater than the magnetic line density within the magnetic permeability bracket 1, that is, ensure the ability of magnetic flux within the material volume of the magnetic permeability bracket 1 greater than the magnetic flux when the part A' is saturated. In this sense, material used for the magnetic permeability bracket 1 and the magnetic permeability material 11 may be magnetic permeability material with the same magnetic permeability or different magnetic permeability. Therefore, during designing and producing, the only thing to choose the magnetic permeability material is to accurately grasp magnetic saturation of the material of the part A' in the magnetic permeability neck 12.

Figure 3:
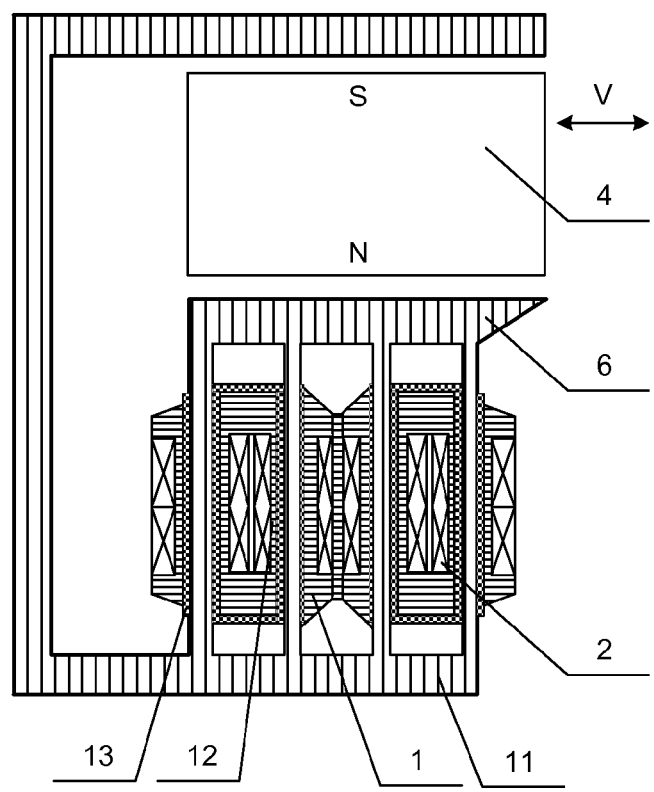
FIG. 3 is a schematic view showing a parallel structure of FIG. 1.
Figure 4:
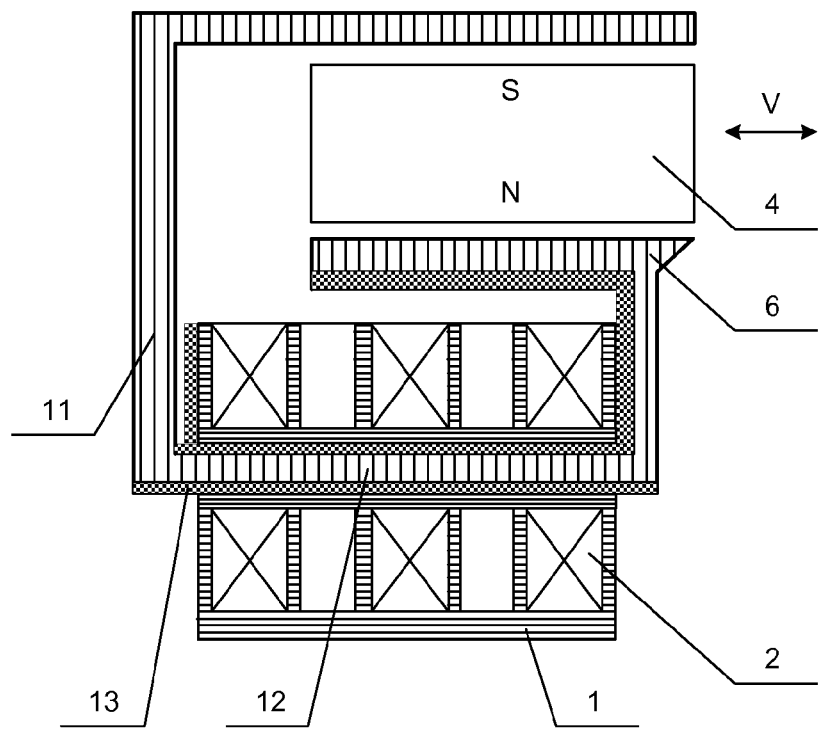
FIG. 4 is a schematic view showing a series structure of FIG. 1.
Figure 5:
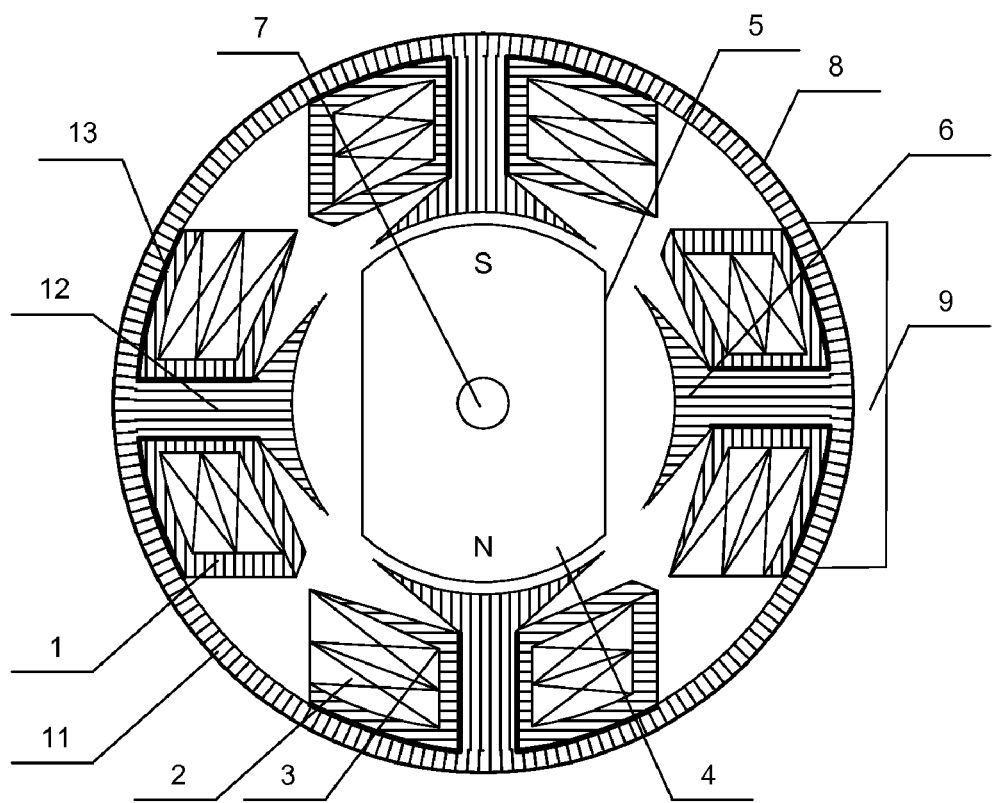
FIG. 5 is a structural schematic view of a primary model.
Figure 6:
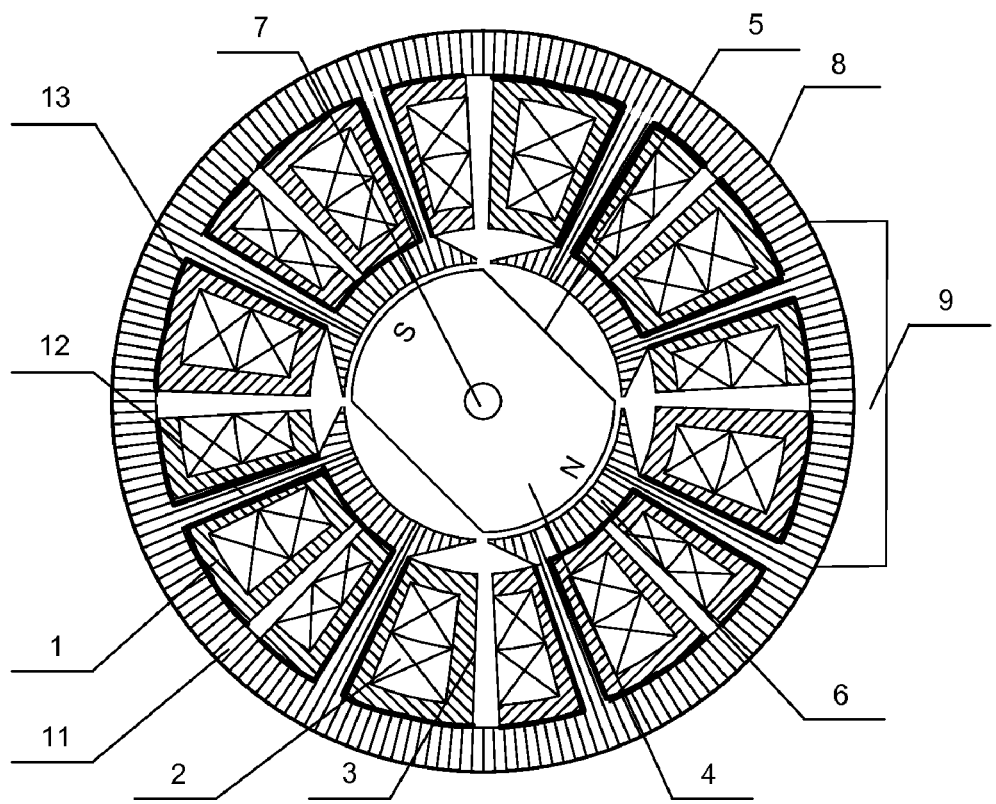
FIG. 6 is a structural schematic view of a parallel model.
Figure 7:
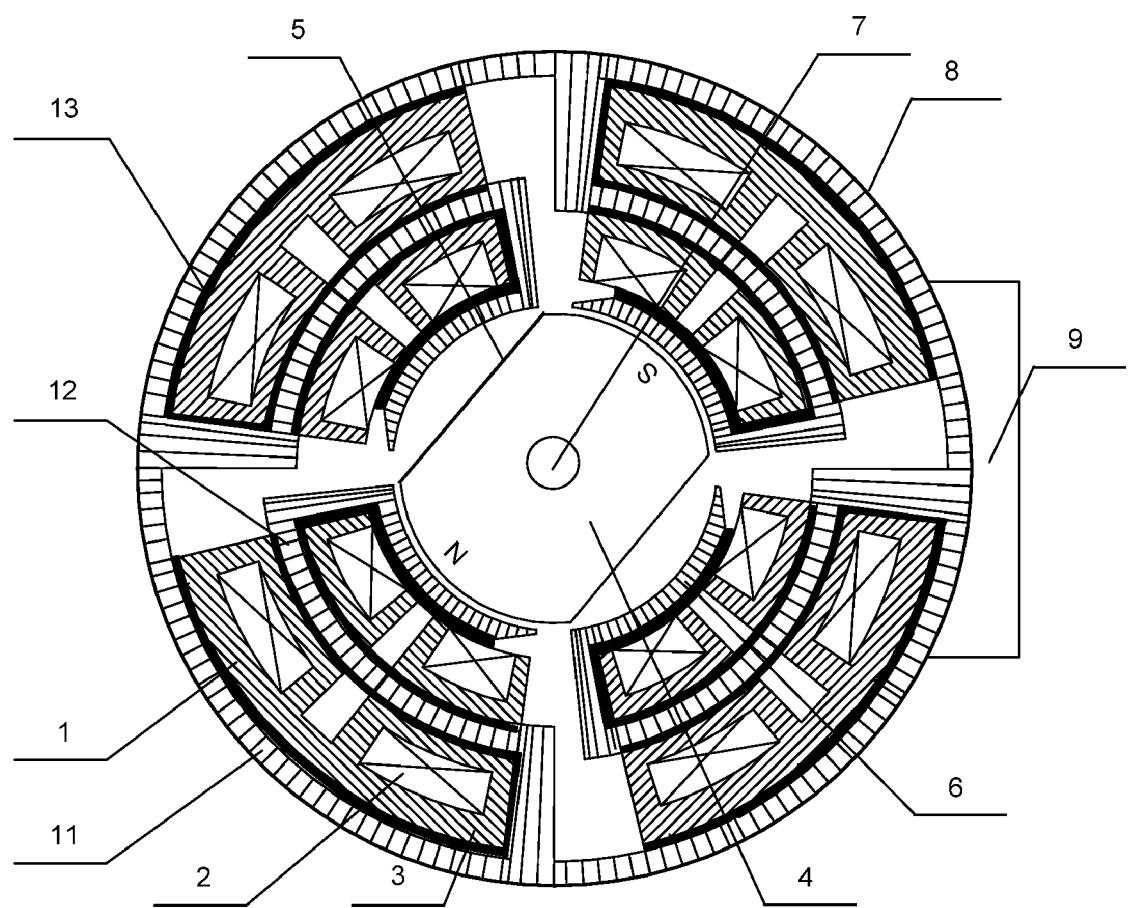
FIG. 7 is a structural schematic view of a series model.
Figure 8:
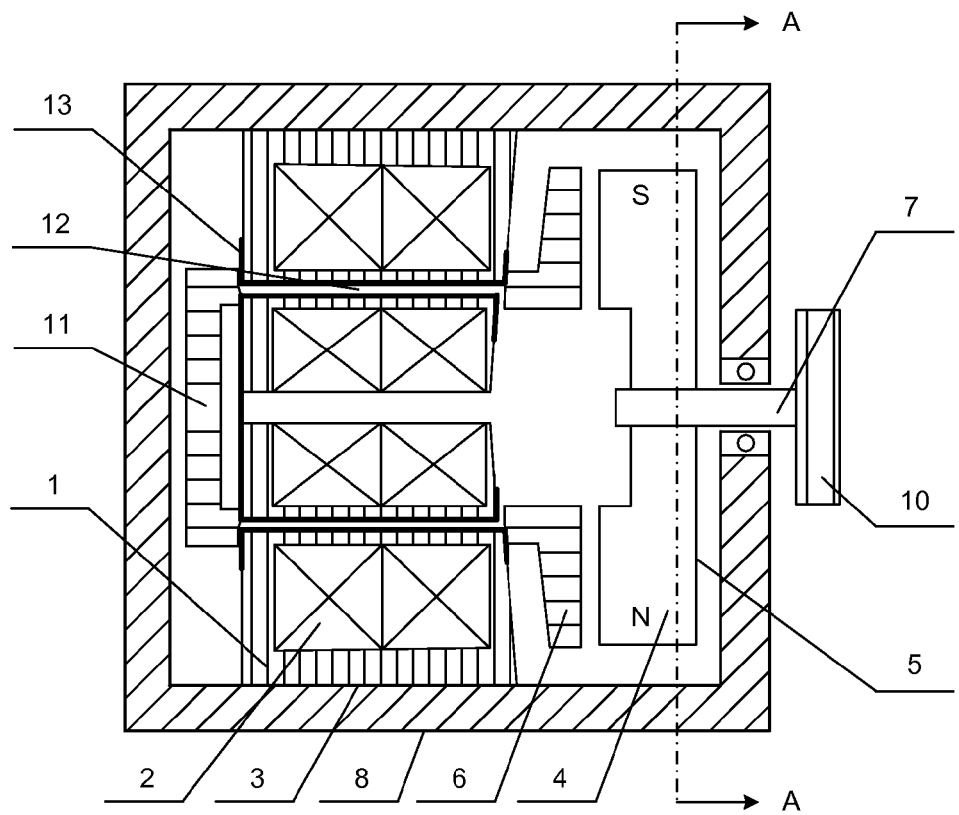
FIG. 8 is a structural schematic view of a bias excitation model.
Figure 9:
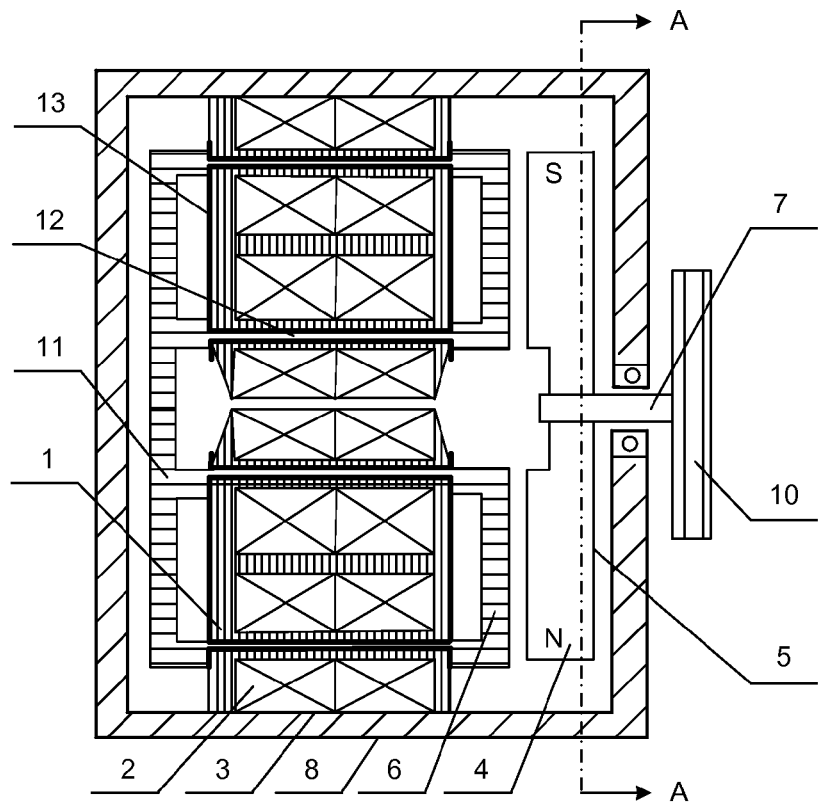
FIG. 9 is a structural schematic view of a bias excitation parallel model.
Figure 10:
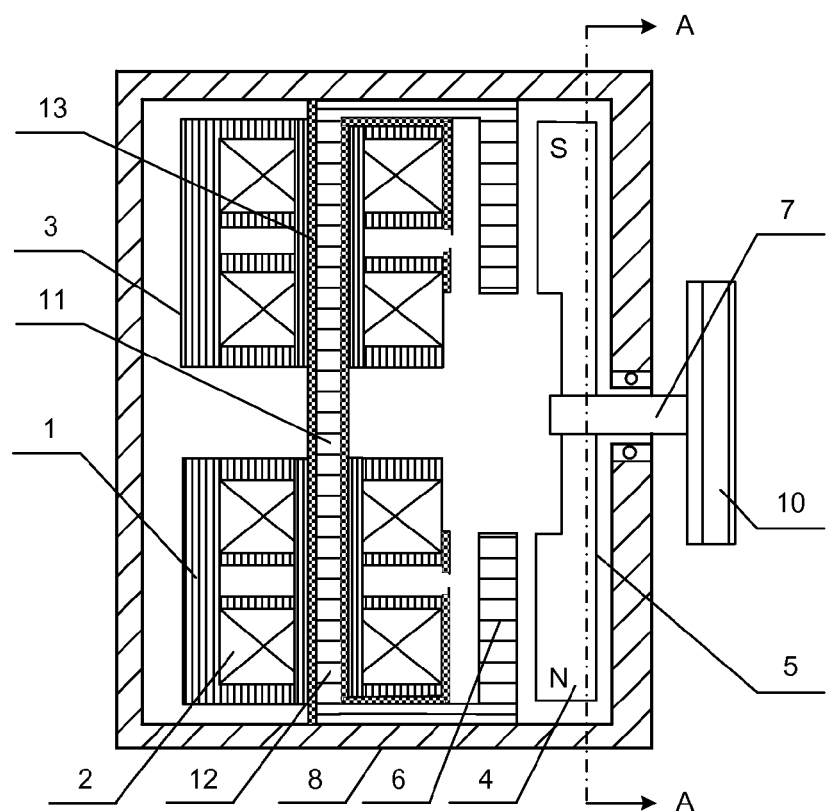
FIG. 10 is a structural schematic view of a bias excitation series model.
Figure 11:
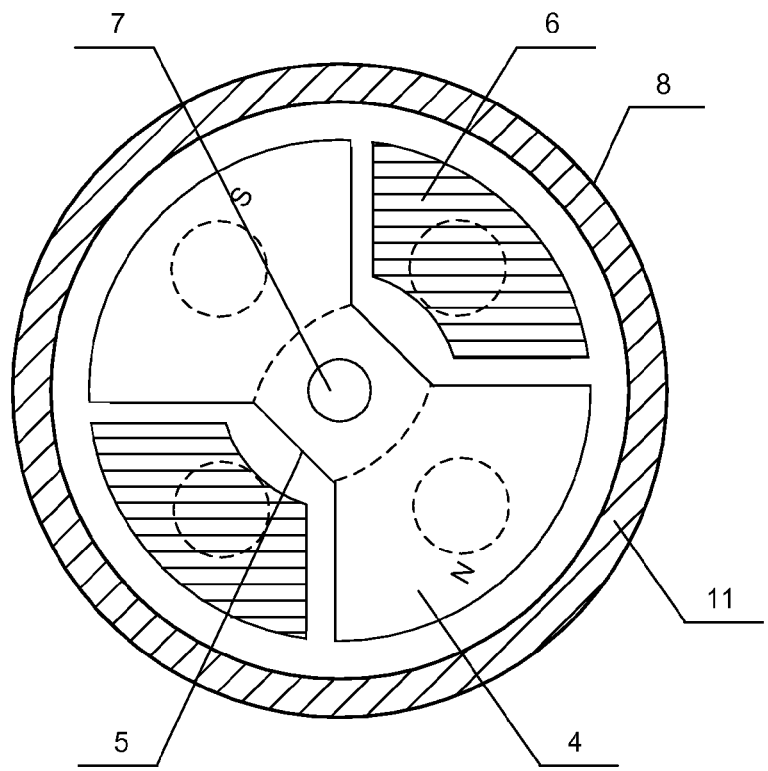
FIG. 11 is a cross-section schematic view along direction A-A in FIG. 8, FIG. 9 and FIG. 10.
Figure 12:
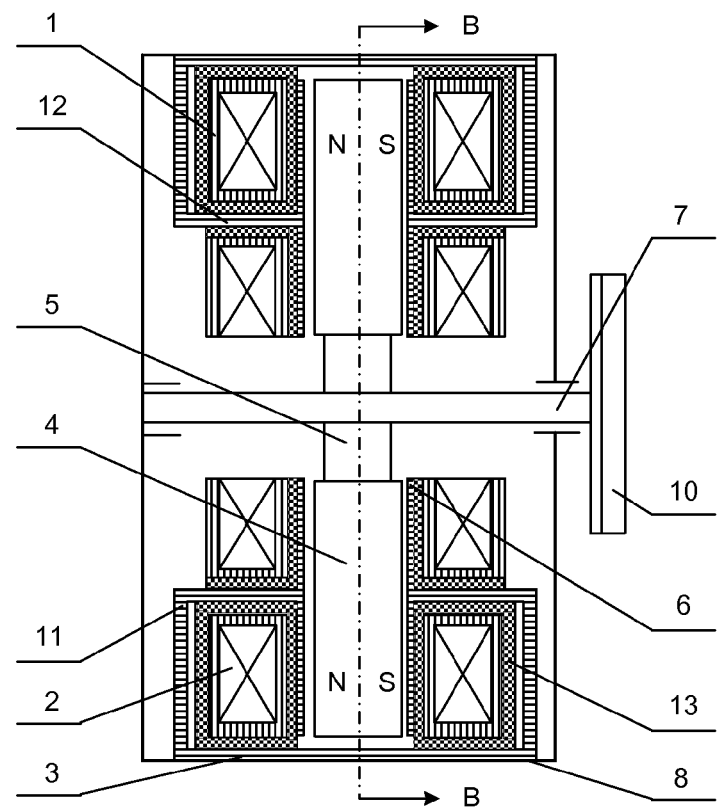
FIG. 12 is a structural schematic view of a middle excitation model.
Figure 13:
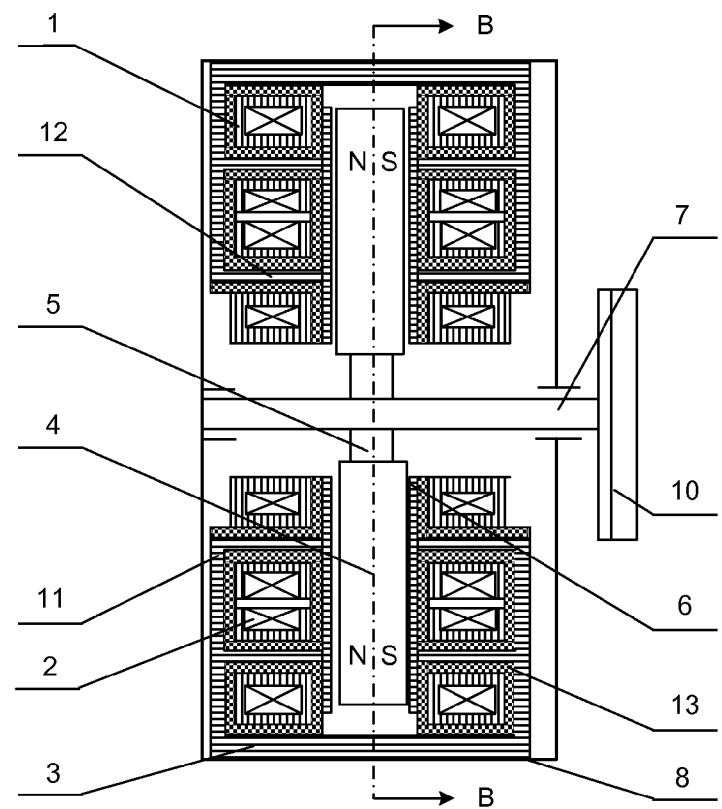
FIG. 13 is a structural schematic view of a middle excitation parallel model.
Figure 14:
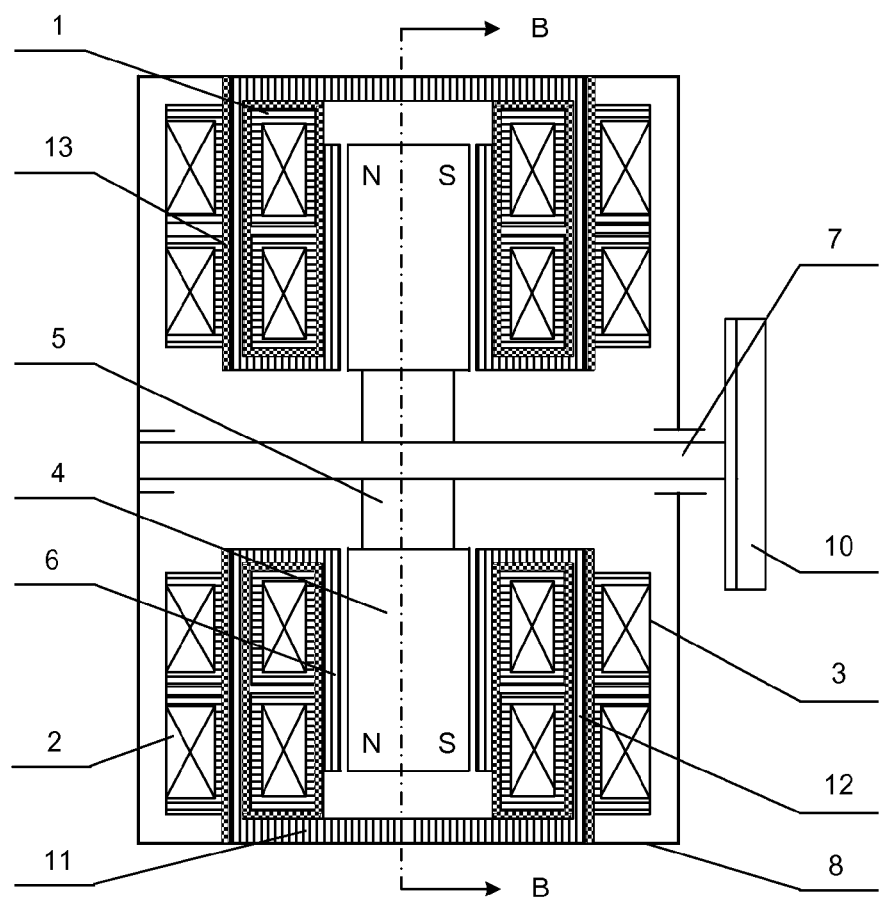
FIG. 14 is a structural schematic view of a middle excitation series model.
Figure 15:
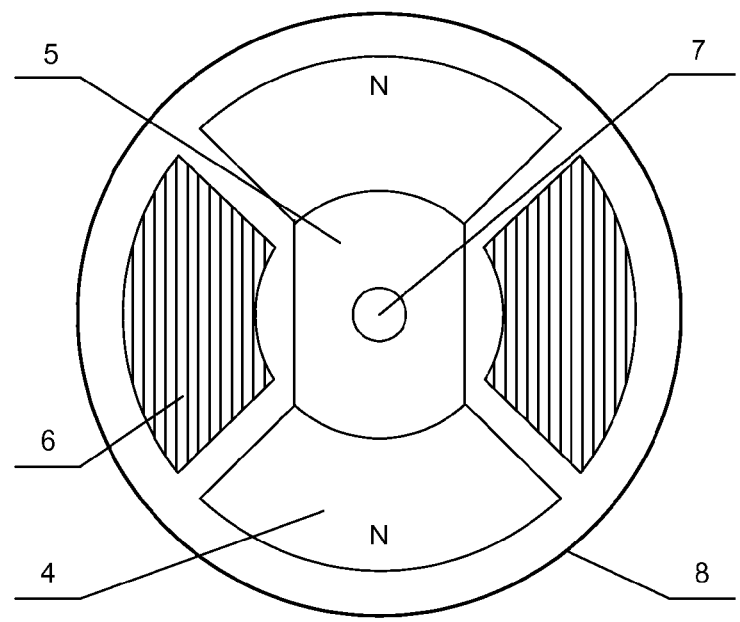
FIG. 15 is a cross-section schematic view along direction B-B in FIG. 12, FIG. 13 and FIG. 14.

According to the above principle, FIG. 3 is a schematic view showing the parallel structure of FIG. 1; FIG. 4 is a schematic view showing the series structure of FIG. 1. The structures shown in FIG. 3 and FIG. 4 are separately parallel model structure and series model structure developed and based on the principle shown in FIG. 1. FIGS. 5 to 15 are primary model structures, parallel model structures and series model structures. These models share the same principle of generating electric current with only difference that space layout is changed according to requirement. In practical implementation, a model with one space layout in the above technical solutions of the present invention can be selected in accordance with demands for social activities.

As shown in FIG. 5 to FIG. 15, the magnetic path closed electric generator of the present invention includes a base 9, a housing 8, a stator 3, a rotator 5 and a rotation shaft 7. The rotator 5 includes a magnetic body 4, magnetic permeability material and a fixing part. The magnetic body 4, the magnetic permeability material and the fixing part are fixed to the rotation shaft 7. The rotation shaft 7 and the housing 8 are fixed in slip connection. A transmission wheel 10 with inputting power is fixed to one end of the rotation shaft 7. The stator 3 is fixed to the housing 8. The housing 8 is made up of magnetic permeability material and serves as mechanical support of a rotating part. The stator 3 is provided with a coil winding 2. The coil winding 2 is fixed to the magnetic permeability bracket 1. The magnetic permeability bracket 1 is made up of at least one kind of magnetic permeability material and runs through the interior of the coil winding 2 to be fixed and communicated to the magnetic permeability material outside the coil winding 2. One hollow core portion of a frame of the magnetic permeability bracket 1 hitches outside the magnetic permeability neck 12 on the stator 3. The housing 8 as well as the magnetic permeability boot 6 and the magnetic permeability neck 12 on the stator 3 are made up of composition of at least one kind of magnetic permeability material. The corresponding overlapping parts between the magnetic permeability bracket 1 and the magnetic permeability neck 12, the magnetic permeability boot 6, and the housing 8 are separated by at least one kind of low magnetic permeability medium 13 and kept in a certain distance. The magnetic permeability neck 12 is provided with the magnetic permeability boot 6 on one end thereof. The magnetic permeability boot 6 is corresponding to one magnetic surface of the magnetic body 4 and the other end of the magnetic permeability boot 6 is fixed to the housing 8. The magnetic body 4 fixed to the rotator 3 may be made up of at least one permanent magnetic body, or at least one electric magnetic body, or an integrated combination of at least one permanent magnetic body and at least one electric magnetic body. The prime mover drives rotator 5 to rotate, to make the magnetic body 4 move along with it. The magnetic body 4 permeates magnetic to the magnetic permeability boot 6 and the magnetic permeability neck 12 on the stator 3. With a magnetic flux change of the magnetic lines within the coil winding 2, the winding coil 2 is inducted to generate electric current. As the low magnetic permeability medium 13 is disposed at a corresponding part between the magnetic permeability bracket 1 and the magnetic permeability neck 12 to separate them in a certain distance, and the magnetic lines tend to pass through the magnetic permeability material which is easiest to pass, the magnetic lines of magnetic field generated by the electric current in the coil winding 2 concentrate at the magnetic permeability material of the magnetic permeability bracket 1 and pass through it to form a magnetic line closed loop. The magnetic lines of the magnetic body 4 start from the N pole, pass through the magnetic permeability boot 6, reaches another end of the magnetic permeability boot 6 along the magnetic permeability material 11, and comes back to the S pole of the magnetic body 4 to enter into the magnetic body 4 so as to form a magnetic line permeability closed loop of the magnetic body 4. Accordingly, the stator 3 and the rotator 5 respectively make magnetic permeate so as to form a magnetic line closed loop. The magnetic lines in the magnetic permeability bracket 1 will not permeate magnetic to the magnetic permeability neck 12 on the stator 3 so that the magnetic permeability boot 6 will not generate the magnetic repelling-attracting force to influence rotation movement of the magnetic body 4 and the rotator 5. When the rotator 5 rotates to drive the magnetic body 4 to move, it does not affected by the magnetic repelling-attracting force generated by the electric current in the coil winding 2. In order to rotate, the rotator 5 only needs to overcome the magnetic attracting force generated by the magnetic body 4 of itself to the material of the magnetic permeability boot 6 and the friction force generated during movement.

Certainly, the magnetic body 4 on the rotator 5 of the magnetic path closed electric generator according to the present invention may be made up of at least one magnetic body. There is at least one coil winding 2 corresponding to every magnetic pole of the magnetic body. The coil windings may be made up of at least one combination of windings in parallel or in series to constitute an electric generator group with different power so as to satisfy various places needing power.

A working process of the magnetic path closed electric generator in accordance with the present invention is as follows: When the prime mover drives the rotator 5 and the magnetic body 4 to rotate by the transmission wheel 10 and the rotation shaft 7, the magnetic surface of the magnetic body 4 permeates magnetic with respect to the magnetic permeability boot 6 and the magnetic permeability neck 12. With the magnetic flux change of the magnetic lines within the coil winding 2, the winding coil 2 is inducted to generate the electric current. The rotator 5 rotates in a fixed speed when its speed reaches a certain value. The electric current generated by the magnetic path closed electric generator is also a certain value. When a prime mover stops rotating, the rotator 5 will also stop rotating, and the magnetic path closed electric generator will also stop generating electric current, stop outputting electric current and stop applying work.

What is claimed is:

1. A magnetic path closed electric generator, comprising a base, a housing, a stator, a rotator, a rotation shaft and a transmission wheel, wherein the rotator is made up of a magnetic body, a magnetic permeability material and a fixing part, and is fixed to the rotation shaft; the rotation shaft and the housing are in slip connection; one end of the rotation shaft is fixed to the transmission wheel for inputting power; the stator is fixed to the housing; the housing is made up of magnetic permeability material and serves as mechanical support of a rotating part; a coil winding is disposed on the stator and is fixed to a magnetic permeability bracket; one frame hollow portion of the magnetic permeability bracket hitches outside a magnetic permeability neck on the stator; a low magnetic permeability medium is disposed between the magnetic permeability bracket and the magnetic permeability neck on the stator to keep them in a certain distance; the transmission wheel drives the rotator to rotate by the rotation shaft; a magnetic permeability boot and the magnetic permeability neck on the stator are inducted by the magnetic body on the rotator to permeate magnetic; with a magnetic flux change of magnetic lines within the coil winding, the winding coil is inducted to generate electric current; the low magnetic permeability medium is disposed between the magnetic permeability bracket and the magnetic permeability neck to separate them in a certain distance; the magnetic lines tend to pass through the magnetic permeability material which is easiest to pass; the magnetic lines and a magnetic field generated by the electric current in the coil winding concentrate at the magnetic permeability bracket and pass through it; the magnetic permeability boot fixed to the stator does not have the magnetic field generated by the coil winding to impede rotation of the rotator; and there is only small magnetic attracting force between the rotator and the stator.

2. The magnetic path closed electric generator according to claim 1, wherein the magnetic permeability bracket fixing the coil winding is made up of at least one kind of the magnetic permeability material.

3. The magnetic path closed electric generator according to claim 1, wherein the magnetic permeability bracket inside the coil winding and outside the coil winding is constituted by fixing and connecting magnetic permeability material.

4. The magnetic path closed electric generator according to claim 1, wherein the housing as well as the magnetic permeability boot and the magnetic permeability neck on the stator are made up of at least one kind of the magnetic permeability material.

5. The magnetic path closed electric generator according to claim 1, wherein corresponding overlapping parts between the magnetic permeability bracket and the magnetic permeability neck, the magnetic permeability bracket and the magnetic permeability boot, and the magnetic permeability bracket and the housing are provided with at least one kind of the low magnetic permeability medium to separate them in a certain distance.

6. The magnetic path closed electric generator according to claim 1, wherein a part of a core portion of a frame of the magnetic permeability bracket corresponding to the magnetic permeability neck is a hollow structure and hitches outside the magnetic permeability neck.

7. The magnetic path closed electric generator according to claim 1, wherein the magnetic permeability boot is disposed at one end of the magnetic permeability neck, the magnetic permeability boot is corresponding to one magnetic surface of the magnetic body on the rotator, and the other end of the magnetic permeability neck is fixed to the housing.

8. The magnetic path closed electric generator according to claim 1, wherein magnetic lines in a magnetic field generated by electric current in the coil winding concentrate at the magnetic permeability bracket and pass through it to form a magnetic line closed loop.

9. The magnetic path closed electric generator according to claim 1, wherein the magnetic body fixed to the rotator is made up of at least one permanent magnetic body or at least one electric magnetic body, or made up of an integrated combination of at least one permanent magnetic body and at least one electric magnetic body.

10. The magnetic path closed electric generator according to claim 1, wherein there is at least one coil winding for magnetic permeability corresponding to every magnetic pole induction of the magnetic body on the rotator, and the coil winding is combined by at least two winding in parallel or in series.

* * * * *